United States Patent
Xie

(10) Patent No.: US 9,018,326 B2
(45) Date of Patent: Apr. 28, 2015

(54) ADHESIVE COMPOSITION FOR BONDING LOW SURFACE ENERGY POLYOLEFIN SUBSTRATES

(71) Applicant: IPS Corporation, Compton, CA (US)

(72) Inventor: Xiaoyi Xie, Diamond Bar, CA (US)

(73) Assignee: IPS Corporation, Compton, CA (US)

( * ) Notice: Subject to any disclaimer, the term of this patent is extended or adjusted under 35 U.S.C. 154(b) by 150 days.

(21) Appl. No.: 13/795,478

(22) Filed: Mar. 12, 2013

(65) Prior Publication Data

US 2013/0267670 A1 Oct. 10, 2013

Related U.S. Application Data

(60) Provisional application No. 61/621,260, filed on Apr. 6, 2012.

(51) Int. Cl.
*C08F 4/52* (2006.01)
*C09J 133/14* (2006.01)
*C08K 5/00* (2006.01)
*C09J 4/00* (2006.01)

(52) U.S. Cl.
CPC .............. *C09J 133/14* (2013.01); *C08K 5/00* (2013.01); *C09J 4/00* (2013.01)

(58) Field of Classification Search
USPC ................................ 526/198, 204; 525/329.7
See application file for complete search history.

(56) References Cited

U.S. PATENT DOCUMENTS

| | | | |
|---|---|---|---|
| 3,920,268 A | 11/1975 | Stewing | |
| 3,920,787 A | 11/1975 | McDowell et al. | |
| 4,200,480 A | 4/1980 | Wolinski et al. | |
| 4,523,779 A | 6/1985 | Knox | |
| 4,726,869 A | 2/1988 | Matsui et al. | |
| 4,743,647 A | 5/1988 | Domeier | |
| 5,021,487 A | 6/1991 | Klemarczyk | |
| 5,486,024 A | 1/1996 | Dierdorf | |
| 5,935,711 A | 8/1999 | Pocius et al. | |
| 6,355,750 B1 | 3/2002 | Herr | |
| 6,391,993 B1 | 5/2002 | Attarwala et al. | |
| 6,740,716 B2 | 5/2004 | Webb et al. | |
| 6,806,330 B1 | 10/2004 | Sonnenschein et al. | |
| 7,235,617 B2 | 6/2007 | Webb et al. | |
| 7,341,285 B2 | 3/2008 | McPherson | |
| 7,510,623 B2 | 3/2009 | Lutz et al. | |
| 7,638,007 B2 | 12/2009 | Sehanobish et al. | |
| 8,063,161 B2 | 11/2011 | Dershem | |
| 8,362,120 B2 | 1/2013 | Huang et al. | |
| 2002/0025381 A1 | 2/2002 | Sonnenschein et al. | |
| 2002/0031607 A1 | 3/2002 | Sonnenschein et al. | |
| 2002/0033227 A1 | 3/2002 | Sonnenschein et al. | |
| 2002/0058764 A1 | 5/2002 | Sonnenschein et al. | |
| 2002/0195453 A1 | 12/2002 | McLeod | |
| 2004/0096610 A1 | 5/2004 | Ramanathan et al. | |
| 2005/0222330 A1 | 10/2005 | Takano | |
| 2006/0191623 A1 | 8/2006 | Lutz et al. | |
| 2009/0090454 A1 | 4/2009 | Lutz et al. | |
| 2009/0173441 A1 | 7/2009 | Lutz et al. | |
| 2010/0259040 A1 | 10/2010 | Kjolseth et al. | |
| 2011/0065260 A1 | 3/2011 | Kawamori et al. | |
| 2011/0133330 A1 | 6/2011 | Bai et al. | |

FOREIGN PATENT DOCUMENTS

| | | |
|---|---|---|
| EP | 1029906 | 8/2000 |
| GB | 2003243 | 3/1979 |
| JP | 05-346189 | 12/1993 |
| WO | 9832206 | 7/1998 |
| WO | 0144311 | 6/2001 |
| WO | 0234852 | 5/2002 |
| WO | 2005017005 | 2/2005 |
| WO | 2005017006 | 2/2005 |
| WO | 2008153883 | 12/2008 |
| WO | 2009078878 | 6/2009 |
| WO | 2010149742 | 12/2010 |

OTHER PUBLICATIONS

U.S. Appl. No. 61/585,733; Filed: Jan. 12, 2012; Inventors: McPherson et al.
Sonnenschein et al., "Physical and Chemical Probes of the Bond Strength between Trialkylboranes and AMines and Their Utility as Stabilized Free Radical Polymerization Catalysts", Macromolecules (2006), 39, 2507-2513.
Wilkes et al., "PVC Handbook", Hanser, 2005 pp. 201-234.
Notification Concerning Transmittal of International Preliminary Report on Patentability corresponding to International Application No. PCT/US2013/030368 mailed Oct. 16, 2014.

*Primary Examiner* — Edward Cain
(74) *Attorney, Agent, or Firm* — Myers Bigel Sibley & Sajovec, P.A.

(57) ABSTRACT

A two-part acrylic adhesive composition comprising at least one organoborane-amine complex initiator and at least one multifunctional maleimide crosslinker.

21 Claims, No Drawings

ADHESIVE COMPOSITION FOR BONDING LOW SURFACE ENERGY POLYOLEFIN SUBSTRATES

CROSS-REFERENCE TO RELATED APPLICATIONS

This application claims priority to U.S. Patent Provisional Application No. 61/621,260, filed Apr. 6, 2012, the entire contents of which are hereby incorporated herein by reference.

BACKGROUND OF THE INVENTION

The present invention relates to adhesive compositions for bonding low surface energy substrates such as polyolefins, particularly to two-part acrylic adhesive compositions.

An efficient, effective means for adhesively bonding low surface energy plastic substrates such as polyethylene, polypropylene and polytetrafluoroethylene (e.g., TEFLON) has long been sought.

One specific area where low surface energy polymer materials of this type find utility is for plastic pipe joints where a mixed adhesive is applied by conventional means using a dauber, brush, swab or other suitable applicator device. One specific application method is to inject the adhesive using one of several well-known and readily available mixing and dispensing devices to the injection pipe joints such as those disclosed in U.S. Pat. Nos. 3,920,787, 3,920,268, 4,523,779, 5,486,024, 7,341,285, and published applications US 2006/0191623, US 2010/0259040 and JP 05-346189, each of which is incorporated by reference herein. In injection pipe joints, an adhesive is injected via a hole in the socket into a gap between a socket and an inserted pipe end and allowed to set after the socket and pipe end have been initially fitted together.

One specific injection pipe design is disclosed in commonly assigned copending U.S. Provisional Application No. 61/585,733, filed Jan. 12, 2012, the entire content of which is incorporated by reference herein.

Acrylic adhesives have been found to have utility for bonding these types of pipe joint designs. See, for example, US 2002/0195453 A1, the entire content of which is incorporated by reference herein.

See also U.S. Pat. No. 6,806,330, the entire content incorporated by reference herein, wherein acrylic adhesives using organoborane amine complex initiators, including trialkylborane-amine radical initiators, were found to provide strong adhesion to polyolefin and fluorinated polymer substrates.

Examples of acrylic adhesives used for pipe fitting wherein an organoborane amine complex initiator, including a trialkylborane amine initiator, is employed with a polymerizable acrylic compound are found in U.S. Pat. No. 7,638,007 and US 2009/0090454, each of which is incorporated by reference herein in its entirety.

A specific example of an acrylic adhesive is disclosed in U.S. Pat. No. 5,935,711, the entire content of which is incorporated by reference herein. The acrylic adhesive is disclosed as comprising a trialkylborane-amine radical initiator in combination with an aziridine functional material wherein the two-part adhesive includes a first part comprising a solution of the organoborane polyamine complex and the aziridine-functional material, wherein the aziridine-functional material is not reactive with the polyamine and a second part comprising a polymerizable blend of alkyl acrylate monomer and alkyl methacrylate monomer. A commercial embodiment of this system does not utilize an unsaturated monomer in the first part, a feature which limits formulation options, and which necessitates more meticulous mixing at the time of use.

Although the organoborane amine complex systems provide good bond strengths with polyolefin substrates, in at least some cases that bond strength does not develop rapidly, requiring cure times of longer than 24 hrs, sometimes as much as 72 hrs, before use loading can be applied to the bond. Also, some organoborane amine systems are quite sensitive to polyolefin source, suggesting antioxidant identities or amounts may impact reactivity of the decomplexed organoborane with the polyolefin substrate. In the plumbing arts, knowledge of the polyolefin source is typically not present so it would be desirable to obtain formulations that have less variability as to polyolefin source and which can reliably achieve high bond strength within a reliable 24 hr turnover time. There remains a need in the art for adhesive compositions having good stability, short turnover time, easy mixing, provide less sensitivity to polymer source and improved adhesion to difficult to bond, low energy surface substrate such as those used for bonding pipe joints.

SUMMARY OF THE INVENTION

In one aspect, the present invention relates to a two-part acrylic adhesive composition comprising at least one organoborane-amine complex initiator and at least one multifunctional maleimide crosslinker.

In another aspect, the present invention relates to a two-part acrylic adhesive composition, the adhesive composition comprising an initiator part and an activator part; the initiator part comprises at least one organoborane-amine complex and the activator part comprises a compound that is reactive with the amine portion of the organoborane-amine complex to liberate organoborane from the complex, wherein, the two part acrylic acid composition further comprises at least one multifunctional maleimide crosslinker and at least one polymerizable (meth)acrylate, each of which is independently present in the initiator part, the activator part or both.

Further aspects of the invention pertain to a two-part acrylic adhesive composition comprising at least one organoborane-amine complex initiator and at least one compound having at least two polymerizable ethylenically unsaturated groups and an aliphatic hydrocarbon linking residue having at least 20 carbon atoms. In some embodiments the polymerizable ethylenically unsaturated groups for said at least one compound having at least two polymerizable ethylenically unsaturated groups and an aliphatic hydrocarbon linking residue having at least 20 carbon atoms are maleimide groups.

In another aspect, the present invention relates to a method of bonding a low surface energy plastic pipe joint comprising mixing a two part acrylic adhesive comprising at least one organoborane-amine complex initiator; and at least one compound having at least two polymerizable ethylenically unsaturated groups and an aliphatic hydrocarbon linking residue having at least 20 carbon atoms and applying the composition to at least one mating surface of the pipe joint, before or after assembling the pipe joint.

The mixed adhesive may be applied by conventional means using a dauber, brush, swab or other suitable applicator device or by injection of the adhesive with one of several well-known and readily available mixing and dispensing devices after assembly of the joint.

The pipe joint may include at least one portion formed of a member of the group consisting of high density polyethylene (HDPE), low density polyethylene (LDPE), polypropylene, polytetrafluoroethylene, cross-linked polyethylene (PEX) and poly(vinylidene fluoride).

In another aspect, the present invention relates to a pipe joint comprising a socket and pipe end, referred to in the trade as the spigot end, bonded by a cured adhesive, wherein at least one of the socket and pipe end is formed of a member of the group consisting of high density polyethylene (HDPE), low density polyethylene (LDPE), polypropylene, polytetrafluoroethylene, cross-linked polyethylene (PEX) and poly(vinylidene fluoride) and the adhesive is cured product comprising at least one organoborane-amine complex initiator; and at least one compound having at least two polymerizable ethylenically unsaturated groups and an aliphatic hydrocarbon linking residue having at least 20 carbon atoms.

These and other aspects, embodiments and advantages of the present disclosure will become immediately apparent to those of ordinary skill in the art upon review of the Detailed Description and Claims to follow.

DETAILED DESCRIPTION OF THE INVENTION

All published documents, including all US patent documents, mentioned anywhere in this application are hereby expressly incorporated herein by reference in their entirety. Any copending patent applications, mentioned anywhere in this application are also hereby expressly incorporated herein by reference in their entirety.

While embodiments of the present disclosure may take many forms, there are described in detail herein specific embodiments of the present disclosure. This description is an exemplification of the principles of the present disclosure and is not intended to limit the disclosure to the particular embodiments illustrated.

The present invention is directed to a polymerizable two-part acrylic adhesive composition including at least one initiator composition and at least one activator composition which when mixed and applied to a substrate forms a polymer material that strongly adheres to the surface thereof, particularly to the surface of low energy substrates such as polyolefins and fluoropolymers. In some cases, such mixing may alternatively be effected by applying each component separately to each of the two substrates to be bonded and bringing the coated substrates into contact to form the bond.

In its broadest aspect, the two-part acrylic adhesive composition comprises at least one organoborane-amine complex capable of forming free radical generating species and at least one multifunctional maleimide crosslinker.

As used herein "multifunctional maleimide" shall be employed to refer to those maleimide crosslinkers having two or more maleimide groups.

In some embodiments, the multifunctional maleimide resin crosslinker is a bismaleimide crosslinker.

The multifunctional maleimide crosslinker can be included in the activator composition, the initiator composition, or both.

The inventive adhesive composition has exceptionally good adhesion to low surface energy polyolefin substrates, for example, polyethylene and polypropylene.

In the initiator part of the two-part composition is suitably included at least one acrylic monomer that is not sufficiently reactive with an amine so as to prematurely decomplex the amine from the organoborane-amine complex. Acrylic oligomers and polymers may also be employed.

In the activator composition of the two-part acrylic composition is suitably included at least one acrylic monomer, although acrylic oligomers and polymers may be employed as well, and at least one compound that readily reacts with amines to decomplex the organoborane-amine complex. Any compound capable of decomplexing the organoborane-amine complex may be employed and will be discussed in more detail below.

The two-part adhesive composition includes at least one polymerizable compound that contains olefinic unsaturation and which can polymerize by free radical polymerization and includes those that are monomeric, oligomeric, or polymeric in nature, as well as mixtures thereof.

The two-part adhesive composition suitably includes at least one ethylenically unsaturated vinyl monomer that is an acrylic monomer including (meth)acrylates, substituted derivates thereof, such as hydroxy, amide, cyano, chloro, and silane derivatives thereof, and comonomers thereof. Mono-, di-, and tri-functional acrylates find utility herein.

Examples of suitable (meth)acrylates include, but are not limited to, methyl (meth)acrylate, ethyl (meth)acrylate, methoxyethyl (meth)acrylate, hydroxyethyl (meth)acrylate, hydroxypropyl (meth)acrylate, cyclohexyl (meth)acrylate, tetrahydrofurfuryl (meth)acrylate, and blends thereof.

In a specific embodiment, tetrahydrofurfuryl methacrylate having the following structure is employed:

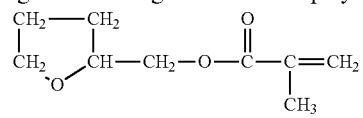

Other (meth)acrylates that find utility herein include, but are not limited to, methyl acrylate, ethyl acrylate, isobornyl methacrylate, hydroxypropyl acrylate, butyl acrylate, n-octyl acrylate, 2-ethylhexyl acrylate, 2-ethylhexyl methacrylate, decyl methacrylate, dodecyl methacrylate, tert-butyl methacrylate, 2-cyanoethyl acrylate, 3-cyanopropyl acrylate, tetrahydrofurfuryl chloroacrylate, glycidyl acrylate, glycidyl methacrylate, and the like.

Acrylate co- and termonomers and oligomers can be optionally employed herein.

Urethane-acrylate oligomers may be employed herein. Typically, these reactive oligomers are added to the compositions to provide flexibility and toughness to the cured adhesive.

Other examples include, but are not limited to, aromatic and aliphatic trifunctional polyether urethane (meth)acrylates, polyester acrylates, dendritic polyester acrylates, aromatic and aliphatic mono- and difunctional polyether urethane acrylates, aromatic and aliphatic di- and tri-functional polyester urethane acrylates, aliphatic linear polyether urethane (meth)acrylates, polybutadiene urethane acrylates, aliphatic polyester urethane acrylates, multifunctional aliphatic urethane acrylates, and so forth.

Other suitable reactive ethylenically unsaturated compounds that can be employed optionally in combination with the (meth)acrylates include acrylamides. Suitable acrylamides include, but are not limited to, acrylamide, N-methylacrylamide, diacetone acrylamide, N-tert-butylacrylamide, N-tert-octylacrylamide, N-butoxyacrylamide, etc.

Siloxane-acrylates may also be optionally included in combination with the (meth)acrylates disclosed herein, typically as adhesion promoters.

In some embodiments epoxies may also be optionally employed in combination with the (meth)acrylates.

In some embodiments the compositions are free of any epoxy.

These lists of (meth)acrylates and modified (meth)acrylates are intended for illustrative purposes only and not as a limitation on the scope of the present invention.

At least one initiator is included in the catalyst composition. The at least one initiator is suitably an organoborane-amine complex.

Suitably, the organoborane portion of the organoborane amine complex has the following general structure:

$$(R^2-B)_v \begin{matrix} R^1 \\ \\ R^3 \end{matrix} \cdot Am$$

wherein $R^1$ is an alkyl group having 1 to 10 carbon atoms and $R^2$ and $R^3$ are independently selected from alkyl groups having 1 to 10 carbon atoms and phenyl groups.

More suitably, $R^1$, $R^2$ and $R^3$ are alkyl groups having 1 to 5 carbon atoms such as methyl, ethyl, propyl, isopropyl, n-butyl, isobutyl, and pentyl.

In some embodiments, $R^1$, $R^2$ and $R^3$ are ethyl groups.

The value of v is selected so as to provide an effective ratio of primary amine nitrogen atoms to boron atoms. The primary amine nitrogen atom to boron ratio is suitably about 1:1 to 1:4, more suitably about 1:1 to 2:1 and most suitably about 1:1, but the ratio may change depending on a variety of factors including if both primary and secondary amine groups are present in the complex. See U.S. Pat. No. 5,935,711, the entire content of which is incorporated by reference herein.

Suitably, the amine portion of the complex, Am, is a polyamine having the following general structure:

$$H_2N-R^6-NH_2$$

wherein $R^6$ is a divalent organic radial comprised of a substituted or unsubstituted alkylene, arylene or alkylarylene group.

More suitably among these materials are the alkane diamines which may be branched or linear and have the following general structure:

$$H_2N-(CH)_x-NH_2 \quad \begin{matrix} R^7 \\ | \\ \end{matrix}$$

wherein $R^7$ is a hydrogen or an alkyl group and x is a whole number greater than or equal to one.

In one embodiment, the polyamine is 1,3-propanediamine wherein $R^7$ is hydrogen and x is 3.

Examples of suitable alkane diamines include, but are not limited to, 1,2-ethanediamine, 1,3-propanediamine, 1,5-pentanediamine, 1,6-hexanediamine, 1,12-dodecanediamine, 2-methyl-1,5-pentane diamine, 3-methyl-1,5-pentane diamine, and isomers of these materials.

Other alkyl polyamines that may find utility herein include, but are not limited to, triethylene tetraamine and diethylene triamine.

Other suitable polyamines are known in the art and include, but are not limited to, polyoxyalkylenepolyamines and polyamines that are the reaction product of diprimary amine-terminated materials (i.e. the two terminal groups are primary amines) and one or more materials containing at least two groups reactive with the primary amine (referred to commonly in the art as difunctional primary amine-reactive material). See, for example, U.S. Pat. No. 5,935,711.

Other suitable amines for the amine portion of the complex, Am, is a monoamine having the following general formula:

$$\begin{matrix} R^4 \\ / \\ N-H \\ \backslash \\ R^5 \end{matrix}$$

wherein $R^4$ and $R^5$ are independently selected from the group consisting of hydrogen, alkyl groups having 1 to 10 carbon atoms, and alkylaryl groups in which the amine group is not directly attached to the aryl structure.

Examples of these amines include, but are not limited to, ammonia, ethylamine, butylamine, hexylamine, octylamine and benzylamine.

The polyamine is suitably a member selected from the group consisting of an alkyl polyamine, polyoxyalkylenepolyamine, and the reaction product of a diprimary amine-terminated material and a material having at least two groups reactive with primary amine, wherein the number of primary amine groups in the reaction mixture was greater than the number of groups reactive with primary amine.

Suitably, a polyamine is selected having between about 2 and 4 amine groups.

In one embodiment, at least one organoborane-amino complex is triethylborane-1,3-diaminopropane complex having the following chemical structure:

$$H_2N\diagdown\diagup NH_2\cdots B(Et)_3$$

The two-part acrylic composition includes at least one activator in the base part that is an amine acceptor and functions to decomplex the organoborane-amine complex.

Examples of suitable classes of activators include, but are not limited to, Bronsted or Lewis acids, isocyanates, aromatic aldehydes, hydroxyl containing acrylic monomers, acids capable of decomplexing the organoborane-amine complex, etc. See SONNENSCHEIN et al., "Physical and Chemical Probes of the Bond Strength between Trialkylboranes and Amines and Their Utility as Stabilized Free Radical Polymerization Catalysts", Macromolecules, 39, 2507-2513 (2006), the entire content of which is incorporated by reference herein. See also US 2009/0090454, the entire content of which is incorporated by reference herein.

The activator liberates organoborane by reacting with the amine. Suitably, the activator is selected from materials that can readily form reaction products with amines at or below room temperature (about 20° C. to about 25° C., suitably about 23° C. or less).

General classes of useful amine reactive compounds include, but are not limited to, acids, anhydrides and aldehydes.

Other activators that may be used include, but are not limited to, isocyanates, acid chloride, sulfonyl chloride, and the like such as isophorone diisocyanate, toluene diisocyanate, methacryloyl chloride and epoxy.

Most suitably, acids are employed as the activator.

Suitable Lewis acids include, but are not limited to, $SnCl_4$ and $TiCl_4$.

Suitable Bronsted acids include, but are not limited to, carboxylic acids. Examples of carboxylic acids include, but are not limited to, acrylic acid, methacrylic acid, acetic acid, benzoic acid, p-methoxybenzoic acid, maleic acid, succinic acid, etc. This list is intended for illustrative purposes only, and not as a limitation on the scope of the present invention.

In some embodiments, maleic acid and/or succinic acid are employed.

In one specific embodiment, maleic acid and a half succinic acid are employed. As used herein succinic acid is a diacid and a half succinic acid shall be used to designate a modified succinic acid wherein one of the carboxylic acid groups of succinic acid has been reacted, typically by esterification. Preferably the esterification is with a hydroxyalkyl (meth) acrylate or other compound that allows it to cure into the adhesive when the two parts are mixed. In one specific embodiment, maleic acid and 2-(methacryloyloxy)ethyl succinate (half succinic acid) are employed as the activators. Similar half acid/half (meth)acrylate esters can be prepared from other dicarboxylic acids.

Other suitable Bronsted acids include HCl, $H_2SO_4$, $H_3PO_4$, phosphonic acid, phosphinic acid, silicic acid, and the like, although less desirable for use than the carboxylic acids.

Materials having at least one anhydride group and aldehydes suitable for use herein are disclosed in U.S. Pat. No. 5,935,711, the entire content of which is incorporated by reference herein.

At least one bismaleimide crosslinker is employed herein. Suitable bismaleimides, include, but are not limited to, the following disclosed bismaleimides.

In one embodiment, a bismaleimide having the following general formula may be employed herein:

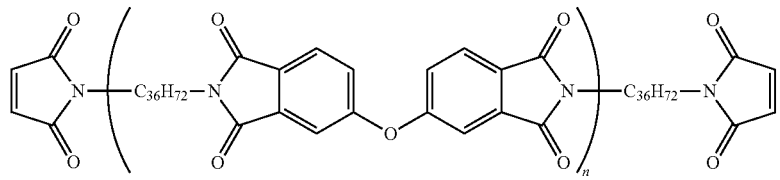

wherein n is 1 to 10. A bismaleimide of this type is available in liquid form from Designer Molecules, Inc. in San Diego, Calif. under the tradename of BMI-1500, CAS No. 1290041-56-3.

Another bismaleimide suitable for use herein has the following general structure:

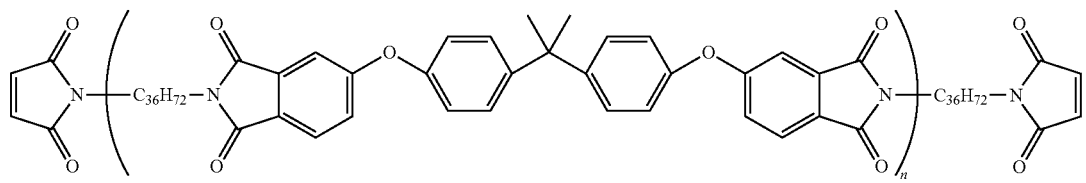

wherein n is 1 to 10. This type of bismaleimide is available in liquid form also from Designer Molecules Inc. under the tradename of BMI-1700, CAS No. 1224691-98-8.

Another bismaleimide suitable for use herein has the following general structure:

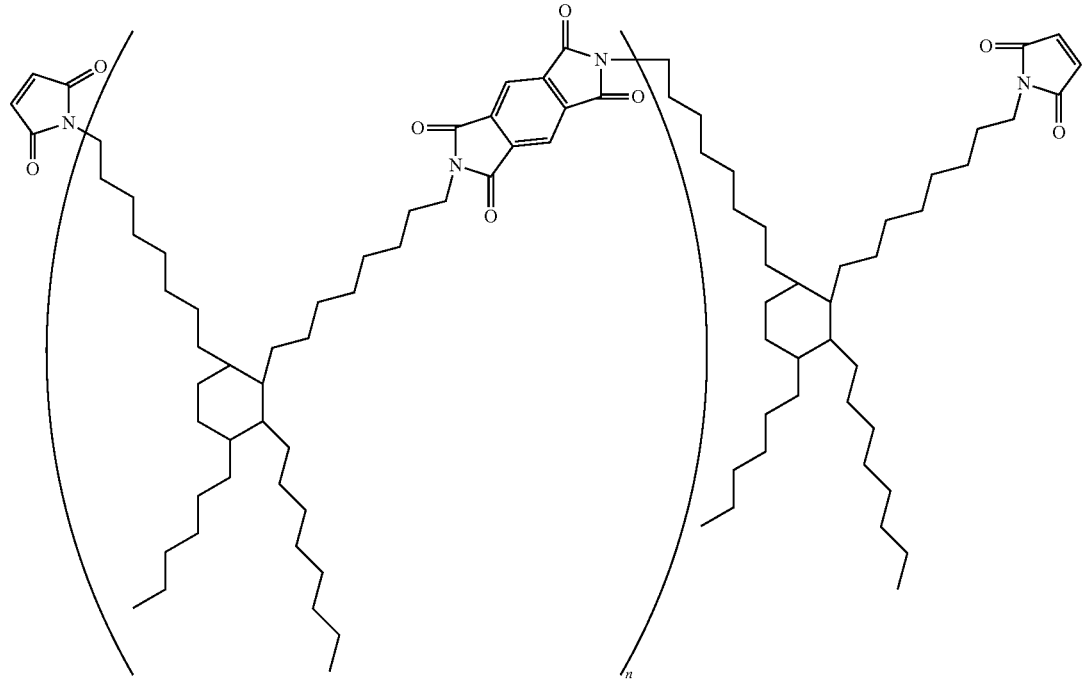

wherein n is 1 to 10. This type of bismaleimide is available in powder form also from Designer Molecules Inc. under the tradename of BMI-3000, CAS No. 921213-77-6. This particular bismaleimide is also available in a 50% solution of toluene and as a gel.

Other suitable bismaleimides are disclosed in U.S. Pat. Nos. 4,743,647 and 8,063,161, US Patent Publication No. 2011/0065260 and 2011/0133330, each of which is incorporated by reference herein.

These bismaleimides are intended for illustrative purposes only and not as a limitation on the scope of the present invention.

The compositions herein also include at least one compound having at least two polymerizable ethylenically unsaturated groups and an aliphatic hydrocarbon linking residue having at least 20 carbon atoms, suitably at least 30 carbon atoms and even more suitably at least 60 carbon atoms.

In some particular embodiments, the at least one compound having at least two polymerizable ethylenically unsaturated groups and an aliphatic hydrocarbon linking residue has 36 carbon atoms, and even more suitably at least 72 carbon atoms. In these embodiments, the number of carbon atoms increases by 18, i.e. 36, 48, 60 or 72 carbon atoms.

In some embodiments the polymerizable ethylenically unsaturated groups for said at least one compound having at least two polymerizable ethylenically unsaturated groups and an aliphatic hydrocarbon linking residue having at least 20 carbon atoms are maleimide groups.

In some embodiments, at least one compound having at least two polymerizable ethylenically unsaturated groups and an aliphatic hydrocarbon linking residue having at least 20 carbon atoms is employed. In one embodiment, the said compound having, but is not limited to, the following general formula may be employed herein:

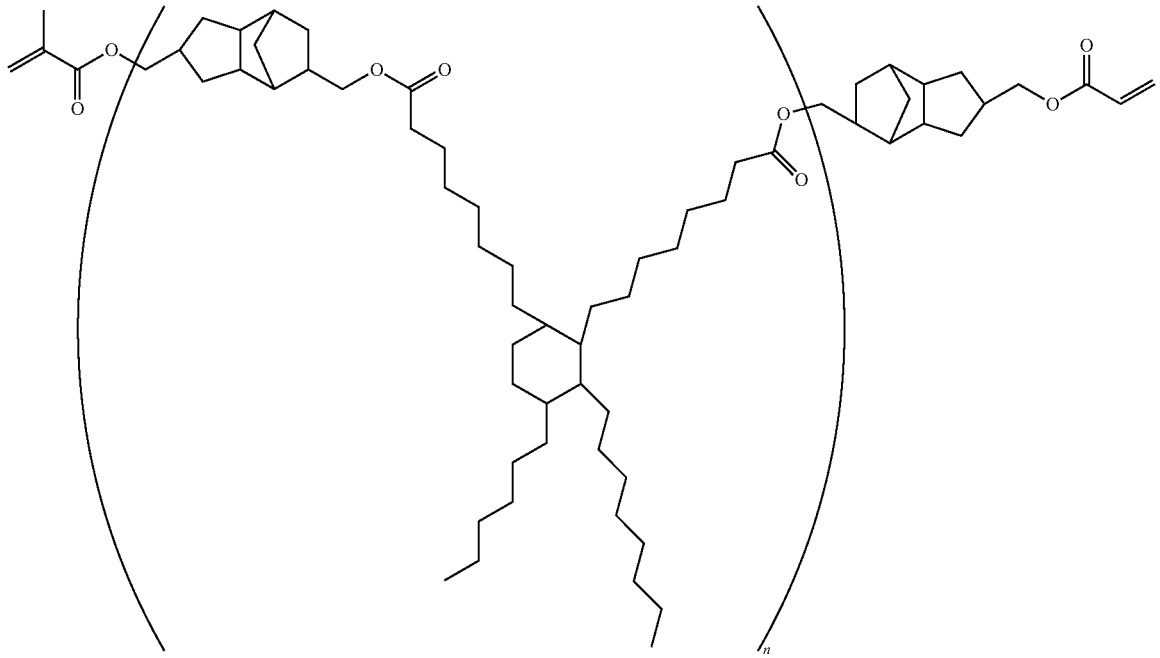

wherein n is 1 to 10. A typical compound of this type is available from Designer Molecules, Inc. in San Diego, Calif. under the tradenames of PEAM-1044 and PEAM-1769. Other suitable compounds for use herein include PEAM-645, PEAM-883, PEM-665 and PEM-1066.

The compositions may further comprise a variety of optional additives. One particularly useful additive is a thickener such as medium to high (about 10,000 to about 1,000,000) molecular weight prepolymers or polymers such as poly (methylmethacrylate) in an amount of about 10 to 40 weight %, based on the total weight of the composition. Thickeners may be employed to increase the viscosity of the composition to a more easily room temperature applied viscous syrup-like consistency.

Other optional additives include non-reactive fillers such as finely divided silica, fumed silica, carbon black, clay, bentonite, glass beads, etc. The fillers may be incorporated into the composition in an amount of from about 0.5% to about 20%, preferably about 1% to about 10% based on the total weight of the composition. Stabilizers and plasticizers may also be employed in the composition.

Impact modifiers may also be optionally added to the composition.

Another particularly useful additive is an elastomeric material for improving the flexibility, elasticity and fracture toughness of the cured composition. The elastomeric material can be incorporated into the composition in an amount of about 1% to 40% by weight, preferably about 5% to about 25% by weight, based on the total weight of the composition.

Examples include elastomeric di- and tri-block copolymers of styrene and at least one member selected from the group consisting of isoprene, butadiene, ethylene-propylene and ethylene-butylene, for example, the A-B-A block copolymers of styrene-butadiene-styrene (SBS), styrene-isoprene-styrene (SIS), styrene-ethylene/butylene-styrene (SEBS) or styrene-ethylene/propylene-styrene (SEPS), and polymers of the branched (A-B)n type including, but not limited to, (styrene-butadiene)n or (styrene-isoprene)n, and di-block (A-B) block copolymers including, but not limited to, styrene-butadiene (SB), styrene-ethylene/propylene (SEP) and styrene-ethylene/butylene (SEB) and styrene-isoprene (SI).

SBS block copolymers are available from Kraton Polymers USA in Houston, Tex. under the tradename of Kraton™ D. Examples include D-1101, D-1102, D-1155, D-1184, D-1186, D-1192, D-4113, D-4153, D-4270, D-4271, D-4272 and D-4274.

SIS block copolymers are also available from Kraton Polymers USA under the tradename of Kraton™ D. Examples include Kraton™ D-1107, D-1111, D-1112, D-1113, D-1117, D-1119, D-1124, D-1160, D-1161, D-1193x, D-1163 and D-1165.

SEBS block copolymers are also available from Kraton Polymers USA under the tradename of Kraton™ G. Examples include Kraton™ G-1650E, G-1651E, G-1652 and G-1654E.

SEP block copolymers are also available from Kraton Polymers USA under the tradename of Kraton™ G and include G-1701E and G-1702.

An SEBS/SEB block copolymer is available from Kraton Polymers USA under the tradename of Kraton™ G-1657

In a specific embodiment a styrene-butadiene-styrene block copolymer available under the name of Kraton™ D is employed in the compositions.

Other preferred elastomeric modifiers are acrylonitrile-butadiene-styrene (ABS) copolymers. Some common ABS copolymers are commercially available from Chemtura Corp. under the trade name Blendex® such as Blendex® 338. One particular ABS copolymer under the name of high rubber grade P60R ABS powder manufactured by Grand Pacific Petrochemical, Taiwan, has been found to be especially useful.

The ABS copolymers may have a core and shell structure or may be random copolymers. ABS copolymers with a higher rubber content such as Blendex® 338 and Grand Pacific P60R more typically have a core and shell configuration and are used as impact modifiers to toughen thermoplastic materials. Molding grades of ABS polymers with lower rubber content are more typically random copolymers.

In addition to ABS core shell polymers, other core-shell polymers can be added to the adhesive composition to modify the flow properties of the uncured adhesive composition and to improve the fracture toughness of the cured adhesive composition. The most common and useful impact modifiers are the methacrylate butadiene styrene (MBS) and all acrylic impact modifiers that are commonly used to improve the toughness of polyvinyl chloride (PVC) polymers. These materials are well known in the art and are described in detail in Chapter 6 of the PVC Handbook Wilkes et al., "PVC Handbook," Hanser, 2005, pages 201-234, which is incorporated by reference herein. The chlorinated polyethylene impact modifiers described therein as well as elastomeric grades of chlorinated polyethylene may also be used in the inventive compositions.

Other useful materials can also be added to the adhesive composition to modify the flow properties of the uncured adhesive composition to improve the fracture toughness of the cured adhesive. Any number of additional soluble or dispersible elastomeric polymers and copolymers can be incorporated into the composition without limitation. These include, but are not limited to, polychloroprene elastomers, chlorosulfonated polyethylene, epichlorohydrin elastomers, styrene butadiene and styrene isoprene elastomers, nitrile elastomers, polyacrylate and ethylene acrylate elastomers and polyurethane elastomers.

The ratio of initiator portion to activator portion can be anywhere from about 1:1 to about 1:10. In commercial and industrial environments, a volume ratio is commonly used for convenience. Some common mixing ratios are 1:1, 1:2, 1:4 and 1:10, but preferably 1:4, more preferably 1:10.

EXAMPLES

Several specific adhesive formulations of the present invention were made as described hereinafter. Each adhesive formulation consists of two parts which were prepared by mixing the ingredients in separate containers just prior to use.

Examples 1-2

Part 1 Initiator: 39.9 g of tetrahydrofurfuryl methacrylate, CAS No. 2455-24-5, 38 g of urethane acrylate oligomer (BR571) commercially available from Bomar Specialties in Torrington, Conn. and 0.1 g of butylated hydroxytoluene (BHT) inhibitor, CAS No. 128-37-0, were added to a Max 100 plastic cup (160 ml). The mixing cup was placed into a dual asymmetric centrifugal Flack Tek DAC 150.1 FV Speed-Mixer. The contents were mixed 3 times consecutively for 1 minute each at a speed of 3,000 rpm to insure that high viscosity monomer and inhibitor were fully dissolved and homogeneous. After the mixture was cooled down, 22 g of triethylborane-1,3-diaminopropane complex, CAS No. 148861-07-8 was added into the mixing cup and mixed for 1 minute at a speed of 3,000 rpm.

Part II Activator Composition: The monomer-polymer syrup was first prepared by dissolving polymers in monomers. Kraton™ D1155 styrene-butadiene-styrene block copolymer, CAS No. 9003-55-8, (960 g) and 2,000 g of tetrahydrofurfuryl methacrylate monomer were added to a 1 gallon metal can and rolled on a ball roll mill for 72 to 120 hours to fully dissolve the polymer in the monomer and form a homogeneous syrup (32.4% polymer). The following components: 47 g of the above monomer-polymer syrup, 42.5 g of tetrahydrofurfuryl methacrylate, 8 g of 2-(methacryloyloxy) ethyl succinate, CAS No. 20882-04-6, and 2.5 g of finely ground maleic acid, CAS No. 110-16-7, were added to a Max 100 plastic cup (160 ml). The mixing cup was placed into a dual asymmetric centrifugal Flack Tek DAC 150.1 FV Speed-Mixer. The contents were mixed 3-5 times consecutively for 1 minute each at a speed of 3,000 rpm to insure that the contents were fully mixed and homogeneous.

Several Part II formulations with an addition of various amounts of a crosslinker bismaleimide resin oligomer (BMI 1500) obtained from Designer Molecules Inc. were prepared using the procedures described above. The formulations are described in Table 1.

The two separate parts of Part I initiator and Part II activator were stored in the separate chambers of a 50 ml dual cartridge from Sulzer Mixpac Ltd, Switzerland in a 1:10 volume ratio respectively. The cartridge was then placed in a hand-held dispenser. A static mixer containing 16 mixing elements was attached to the cartridge. The Part I initiator and Part II activator were mixed by the simultaneous extrusion through the static mixer and were directly applied onto the test substrates. When Part I initiator and Part II activator were mixed, an acid activator reacted with the amine and destabilized the organoborane amine complex liberating the free organoborane which initiates the polymerization.

Samples of the adhesive were evaluated to measure the lap shear bond strength and failure mode. The adhesive was dispensed onto a substrate with dimensions 2 inch×1 inch×¼ inch thick (50.8 mm×25.4 mm×6.4 mm). The surface of the substrates was cleaned with a solvent methyl ethyl ketone (MEK) and dried prior to bonding. Two pieces of PETG plastic sheet (1 inch long, 0.5 inch wide, 20 mil thick) (25.4 mm×12.7 mm×0.5 mm) were used as spacer and placed to each end of the first substrate. The mixed adhesive was applied and spread near the center of the substrate to cover a 1 inch×1 inch (25.4 mm×25.4 mm) area. A second substrate was brought against the adhesive to form an overlap adhesive joint with 1 inch (25.4 mm) overlap. The adhesive joint was fixtured with a clamp and allowed to cure at room temperature (about 23° C.) for 24 hours. Three adhesive joints were made with each adhesive formulation. The adhesive joint was tested until failure by compression loading on a material testing machine (United Testing System, Model STM-20) equipped with a 20,000 lb. (9072 kg) load cell at a rate of 0.05 inch (1.27 mm) per minute. The lap shear strengths are an average of three measurements and are reported in psi (pound per square inch) to the nearest whole number. The debonded adhesive joints were visually inspected to determine the failure mode. The results are summarized in Table 1 below:

TABLE 1

|  | Comparative Example A | Example 1 | Example 2 |
|---|---|---|---|
| Part I - Initiator Composition (WT. %) | | | |
| Tetrahydrofurfuryl methacrylate | 39.9 | 39.9 | 39.9 |
| Urethane acrylate oligomer (BR571) | 38 | 38 | 38 |
| Triethylborane-1,3-diaminopropane complex | 22 | 22 | 22 |
| Butylated hydroxytoluene | 0.1 | 0.1 | 0.1 |
| Part II - Activator Composition (WT. %) | | | |
| Tetrahydrofurfuryl methacrylate | 74.27 | 69.27 | 64.27 |
| Kraton D1155 block copolymer | 15.23 | 15.23 | 15.23 |
| Bismaleimide resin oligomer (BMI1500) | — | 5 | 10 |
| 2-(Methacryloyloxy)ethyl succinate | 8 | 8 | 8 |
| Maleic acid | 2.5 | 2.5 | 2.5 |
| Substrate | PP | PP | PP |
| Lap Shear Strength, psi (mPa) | 1322 (9.1) | 1579 (10.9) | 1809 (12.5) |
| Failure Mode | Cohesive | Mixed | Substrate |

Examples 1-2 clearly illustrate that the adhesive formulations containing crosslinker bismaleimide resin oligomer have much stronger bond strengths to adhere low surface energy substrates such as polypropylene (PP) than the adhesive without bismaleimide resin oligomer.

Examples 3-4

Additional Part I initiator composition and Part II activator composition with variation of monomers were prepared using the procedures described above. Several Part II formulations with an addition of various amounts of the crosslinker bismaleimide resin oligomer (BMI1500) obtained from Designer Molecules Inc. were also prepared. The formulations and properties are summarized in Table 2.

TABLE 2

|  | Comparative Example B | Example 3 | Example 4 |
|---|---|---|---|
| Part I - Initiator Composition (WT. %) | | | |
| Tetrahydrofurfuryl methacrylate | 31.9 | 31.9 | 31.9 |
| Benzyl methacrylate | 8 | 8 | 8 |
| Urethane acrylate oligomer (BR571) | 38 | 38 | 38 |
| Triethylborane-1,3-diaminopropane complex | 22 | 22 | 22 |
| Butylated hydroxytoluene | 0.1 | 0.1 | 0.1 |
| Part II - Activator Composition (WT. %) | | | |
| Tetrahydrofurfuryl methacrylate | 48.5 | 45.15 | 41.77 |
| 2-Ethylhexyl Methacrylate | 22.5 | 22.5 | 22.5 |
| Kraton D1155 block copolymer | 18.5 | 16.85 | 15.23 |
| Bismaleimide resin oligomer (BMI1500) | — | 5 | 10 |
| 2-(Methacryloyloxy)ethyl succinate | 8 | 8 | 8 |
| Maleic acid | 2.5 | 2.5 | 2.5 |
| Substrate | PP | PP | PP |
| Lap Shear Strength, psi (mPa) | 1390 (9.6) | 1715 (11.8) | 1643 (11.3) |
| Failure Mode | Cohesive | Substrate | Substrate |

Examples 3-4 also clearly illustrate that the bond strengths obtained using a bismaleimide resin crosslinker are much higher than comparative example B which has no bismaleimide resin crosslinker.

Examples 5-6

Additional Part I initiator composition and Part II activator composition with combination of Kraton™ D1155 block copolymer, CAS No. 9003-55-8, and HRG P60R ABS copolymer, CAS No. 9003-56-9, were prepared using the procedures described above. Several Part II formulations with an addition of various amount of a crosslinker bismaleimide resin oligomer (BMI1500) were also prepared. The formulations and properties are summarized in Table 3.

TABLE 3

|  | Comparative Example C | Example 5 | Example 6 |
|---|---|---|---|
| Part I - Initiator Composition (WT. %) | | | |
| Tetrahydrofurfuryl methacrylate | 39.9 | 39.9 | 39.9 |
| Urethane acrylate oligomer (BR571) | 38 | 38 | 38 |
| Triethylborane-1,3-diaminopropane complex | 22 | 22 | 22 |
| Butylated hydroxytoluene | 0.1 | 0.1 | 0.1 |
| Part II - Activator Composition (WT. %) | | | |
| Tetrahydrofurfuryl methacrylate | 49.71 | 46.16 | 42.62 |
| 2-Ethylhexyl Methacrylate | 20 | 20 | 20 |
| Kraton ™ D1155 block copolymer | 11.99 | 11.02 | 10.04 |
| HRG P60R ABS copolymer | 7.8 | 7.32 | 6.84 |
| Bismaleimide resin oligomer (BMI1500) | — | 5 | 10 |
| 2-(Methacryloyloxy)ethyl succinate | 8 | 8 | 8 |
| Maleic acid | 2.5 | 2.5 | 2.5 |
| Substrate | PP | PP | PP |
| Lap Shear Strength, psi (mPa) | 1389 (9.6) | 1778 (12.3) | 1767 (12.2) |
| Failure Mode | Cohesive | Substrate | Substrate |
| Substrate | HDPE | HDPE | HDPE |
| Lap Shear Strength, psi (mPa) | 1178 (8.1) | 1204 (8.3) | 1171 (8.1) |
| Failure Mode | Cohesive | Substrate | Substrate |
| Substrate | LDPE | LDPE | LDPE |

TABLE 3-continued

|  | Comparative Example C | Example 5 | Example 6 |
|---|---|---|---|
| Lap Shear Strength, psi (mPa) | 467 (3.2) | 553 (3.8) | 550 (3.8) |
| Failure Mode | Substrate | Substrate | Substrate |
| Substrate | PEX | PEX | PEX |
| Lap Shear Strength, psi (mPa) | 590 (4.1) | 789 (5.4) | 732 (5.0) |
| Failure Mode | Adhesive | Adhesive | Adhesive |
| Substrate | PVDF | PVDF | PVDF |
| Lap Shear Strength, psi (mPa) | 817 (5.6) | 1171 (8.1) | 1163 (8.0) |
| Failure Mode | Adhesive | Adhesive | Adhesive |
| Substrate | Teflon | Teflon | Teflon |
| Lap Shear Strength, psi (mPa) | 771 (5.3) | 811 (5.6) | 788 (5.4) |
| Failure Mode | Cohesive | Substrate | Substrate |

The examples 5-6 clearly illustrate that the adhesive formulations containing crosslinker bismaleimide resin oligomer have much stronger bond strengths to adhere low surface energy substrate polypropylene (PP) than the adhesive without bismaleimide resin oligomer. In addition, the bond strengths to high density polyethylene (HDPE) and low density polyethylene (LDPE), cross-linked polyethylene (PEX), poly(vinylidene fluoride) (PVDF) and polytetrafluoroethylene (PTFE/Teflon) are also improved.

Examples 7-9

Additional Part I initiator composition and Part II activator composition with combination of two impact modifiers: Kraton D1155 block copolymer and HRG P60R ABS copolymer were again prepared using the procedures described above. Several Part II formulations with an addition of a crosslinker bismaleimide resin oligomer (BMI1700) or other crosslinker having at least two polymerizable ethylenically unsaturated groups and an aliphatic hydrocarbon linking residue having at least 20 carbon atoms (PEAM1044) were also prepared. The formulations and properties are summarized in Table 4.

TABLE 4

|  | Example 7 | Example 8 | Example 9 |
|---|---|---|---|
| Part I - Initiator Composition (WT. %) | | | |
| Tetrahydrofurfuryl methacrylate | 39.9 | 39.9 | 39.9 |
| Urethane acrylate oligomer (BR571) | 38 | 38 | 38 |
| Triethylborane-1,3-diaminopropane complex | 22 | 22 | 22 |
| Butylated hydroxytoluene | 0.1 | 0.1 | 0.1 |
| Part II - Activator Composition (WT. %) | | | |
| Tetrahydrofurfuryl methacrylate | 46.16 | 43.54 | 43.54 |
| 2-Ethylhexyl Methacrylate | 20 | 20 | 15 |
| Kraton ™ D1155 block copolymer | 11.02 | 6.48 | 6.48 |
| HRG P60R ABS copolymer | 7.32 | 9.48 | 9.48 |
| Bismaleimide resin oligomer (BMI1700) | 5 | | |
| Polyester acrylate/methacrylate (PEAM1044) | | 10 | 15 |
| 2-(Methacryloyloxy)ethyl succinate | 8 | 8 | 8 |
| Maleic acid | 2.5 | 2.5 | 2.5 |
| Substrate | PP | PP | PP |
| Lap Shear Strength, psi (mPa) | 1703 (11.7) | 1432 (9.9) | 1569 (10.8) |
| Failure Mode | Substrate | Substrate | Substrate |

Examples 7-9 clearly illustrate that the adhesive formulations containing crosslinker bismaleimide resin oligomer (BMI1700) or other crosslinkers having at least two polymerizable ethylenically unsaturated groups and an aliphatic hydrocarbon linking residue having at least 20 carbon atoms (PEAM1044) have much higher bond strengths to adhere low surface energy substrates such as polypropylene (PP) than adhesives without these crosslinkers.

Comparative Examples

Two popular commercial adhesive products for bonding low surface energy plastic substrates were evaluated for comparison. One adhesive of this type is designated M. Another adhesive of this type is designated L. The compressive shear strengths were measured under the similar conditions. The results, summarized in Table 5 below, illustrate significantly lower compressive lap shear strengths on the same variety of substrates when compared with inventive examples 5 and 6 for the preferred inventive compositions. This ability to broadly provide superior bonds on polyolefin and other low surface energy indicates less sensitivity to the specific polymer source which is a primary benefit of the inventive compositions over the prior art.

TABLE 5

|  | M | L |
|---|---|---|
| Substrate | PP | PP |
| Lap Shear Strength, psi (mPa) | 1233 (8.5) | 1262 (8.7) |
| Failure Mode | Cohesive | Adhesive |
| Substrate | HDPE | HDPE |
| Lap Shear Strength, psi (mPa) | 863 (6.0) | 935 (6.4) |
| Failure Mode | Cohesive | Cohesive |
| Substrate | LDPE | LDPE |
| Lap Shear Strength, psi (mPa) | 451 (3.1) | 451 (3.1) |
| Failure Mode | Substrate | Substrate |
| Substrate | PEX | PEX |
| Lap Shear Strength, psi (mPa) | 774 (5.3) | 728 (5.0) |
| Failure Mode | Cohesive | Cohesive |
| Substrate | PVDF | PVDF |
| Lap Shear Strength, psi (mPa) | 1058 (7.3) | 613 (4.2) |
| Failure Mode | Adhesive | Adhesive |
| Substrate | Teflon | Teflon |
| Lap Shear Strength, psi (mPa) | 559 (3.9) | 117 (0.8) |
| Failure Mode | Cohesive | Adhesive |

The description provided herein is not to be limited in scope by the specific embodiments described which are intended as single illustrations of individual aspects of certain embodiments. The methods, compositions and devices described herein can comprise any feature described herein either alone or in combination with any other feature(s) described herein. Indeed, various modifications, in addition to those shown and described herein, will become apparent to those skilled in the art from the foregoing description and accompanying drawings using no more than routine experimentation. Such modifications and equivalents are intended to fall within the scope of the appended claims.

The invention claimed is:

1. A two-part acrylic adhesive composition comprising:
   an acrylic oligomer or polymer,
   at least one organoborane-amine complex initiator, and
   at least one multifunctional maleimide crosslinker.

2. The two-part acrylic adhesive composition of claim 1 wherein the organoboraneamine complex initiator is a trialkylborane-amine complex.

3. The two-part acrylic adhesive composition of claim 2 wherein the trialkylboraneamine complex is triethylborane-1,3-diaminopropane.

4. The two-part acrylic adhesive composition of claim 1 wherein the multifunctional maleimide crosslinker comprises at least two maleimide end groups per molecule.

5. The two-part acrylic adhesive composition of claim 1 wherein the multifunctional maleimide crosslinker is a bis-maleimide crosslinker.

6. The two-part acrylic adhesive composition of claim 5 wherein the bismaleimide crosslinker is selected from the group having the following general structure:

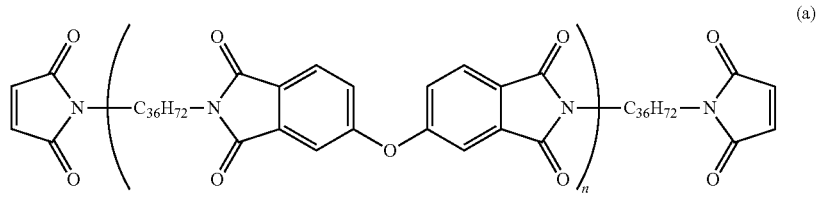

(a)

wherein n is 1 to 10; and

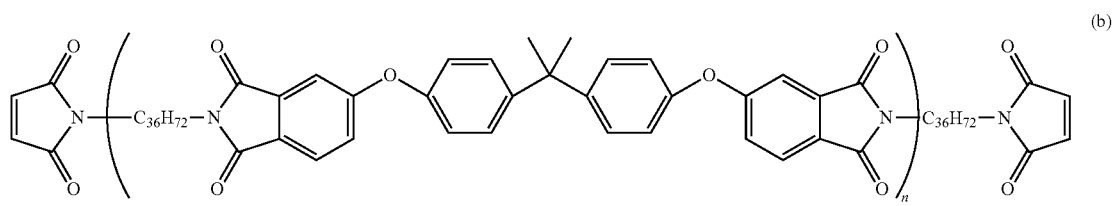

(b)

wherein n is 1 to 10.

7. The two-part acrylic adhesive composition of claim 1 wherein a first part that is an initiator part comprises at least one organoborane-amine complex initiator, and optionally at least one non-polymerizable plasticizer.

8. The two-part acrylic adhesive composition of claim 1 wherein a second part that is an activator part further comprises at least one activator which is an amine acceptor for decomplexing the organoborane-amine complex.

9. The two-part acrylic adhesive composition of claim 8 wherein the at least one activator comprises at least one organic acid.

10. The two-part acrylic adhesive composition of claim 9 wherein the at least one organic acid is a carboxylic acid.

11. The two-part acrylic adhesive composition of claim 10 wherein the carboxylic acid comprises at least one member selected from the group consisting of (meth)acrylic acid, acetic acid, benzoic acid, p-methoxybenzoic acid, maleic acid, succinic acid and mixtures thereof.

12. The two-part acrylic adhesive composition of claim 1 further comprising at least one polymerizable ethylenically unsaturated monomer, oligomer or a combination thereof.

13. The two-part acrylic adhesive composition of claim 12 wherein said at least one polymerizable ethylenically unsaturated monomer or oligomer is a (meth)acrylate monomer or (meth)acrylate-functionalized oligomer.

14. The two-part acrylic adhesive composition of claim 1 further comprises at least one thickener, elastomer or a combination thereof.

15. The two-part acrylic adhesive composition of claim 14 wherein said two-part acrylicadhesive composition comprises at least one elastomer that is a styrene-butadienestyrene block copolymer, an acrylonitrile-butadiene-styrene copolymer, or a combination thereof.

16. A two-part acrylic adhesive composition comprising:
a) an initiator part, the initiator part comprising at least one organoboraneamine complex; and
b) an activator part, the activator part comprising a compound that is reactive with the amine portion of the organoborane-amine complex to liberate organoborane from the complex;
wherein the two-part acrylic adhesive composition further comprising at least one multifunctional maleimide crosslinker and at least one polymerizable (meth)acrylate monomer, each of which is independently present in the initiator part, the activator part or both.

17. The two-part acrylic adhesive composition of claim 16 wherein the organoboraneamine complex is triethylborane-1,3-diaminopropane complex.

18. The two-part acrylic adhesive composition of claim 16 wherein said compound that is reactive with the amine portion of the organoborane-amine complex comprises maleic acid, 2-(methacryloyloxy)ethyl succinate or a combination thereof.

19. The two-part acrylic adhesive composition of claim 16 wherein the multifunctional maleimide crosslinker is selected from the group having the following general structure:

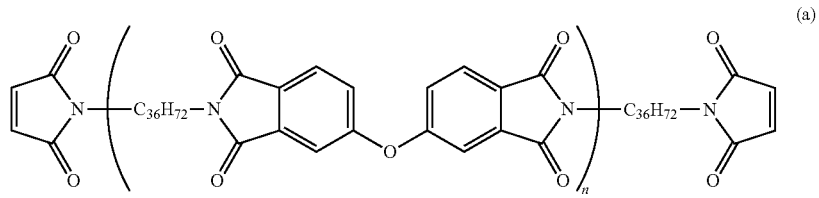

wherein n is 1 to 10; and

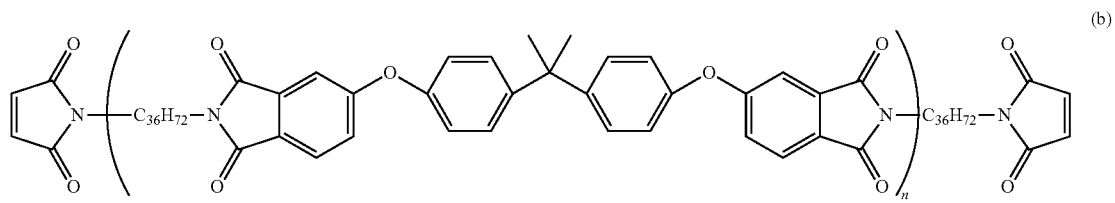

wherein n is 1 to 10.

20. A two-part acrylic adhesive composition comprising:
at least one organoborane-amine complex initiator; and
at least one compound having at least two polymerizable ethylenically unsaturated groups and an aliphatic hydrocarbon linking residue having at least 20 carbon atoms.

21. The two-part acrylic adhesive composition of claim 20 wherein said at least one compound having at least two polymerizable ethylenically unsaturated groups and an aliphatic hydrocarbon linking residue having at least 20 carbon atoms has the following general structure:

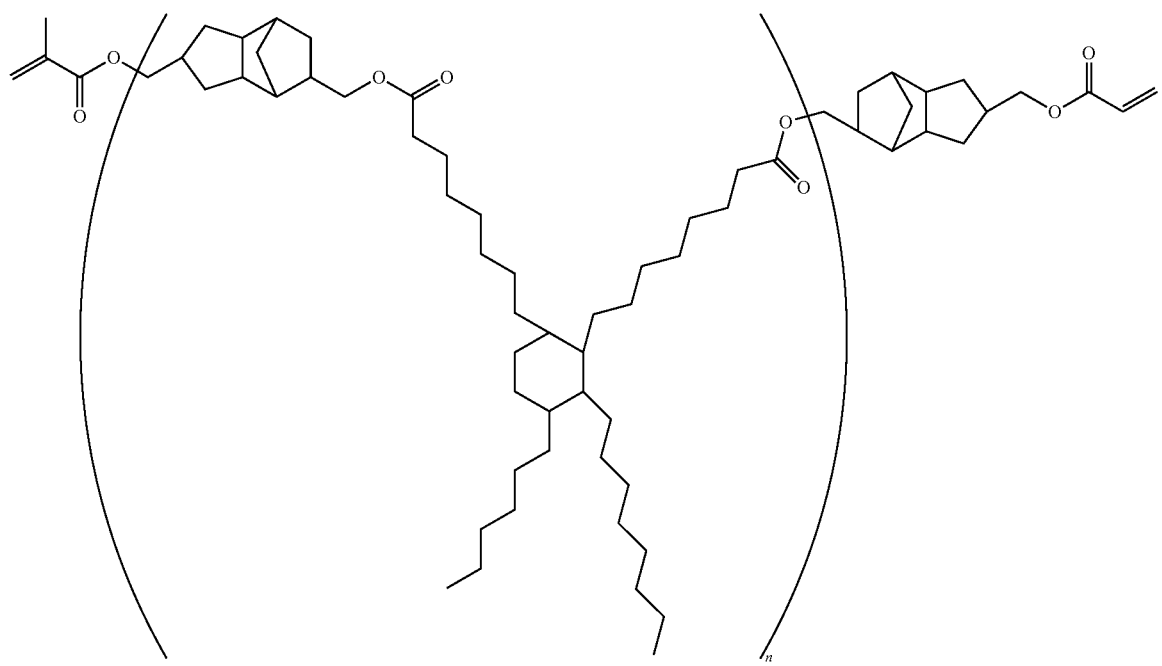

wherein n is 1 to 10.

* * * * *